United States Patent
Wasson et al.

(10) Patent No.: US 9,503,001 B2
(45) Date of Patent: Nov. 22, 2016

(54) REMOTELY-PROGRAMMABLE CONTROL CIRCUIT FOR SINGLE-PHASE MOTOR

(71) Applicant: McMillan Electric Company, Woodville, WI (US)

(72) Inventors: Dewain Wasson, Hudson, WI (US); Karmen Darrell Cox, St. Peters, MO (US)

(73) Assignee: McMillan Electric Company, Woodville, WI (US)

( * ) Notice: Subject to any disclaimer, the term of this patent is extended or adjusted under 35 U.S.C. 154(b) by 560 days.

(21) Appl. No.: 13/830,284

(22) Filed: Mar. 14, 2013

(65) Prior Publication Data

US 2014/0277758 A1    Sep. 18, 2014

(51) Int. Cl.
*G05D 23/19* (2006.01)
*F24F 11/00* (2006.01)

(52) U.S. Cl.
CPC .......... *H02P 6/26* (2016.02); *F24F 2011/0083* (2013.01)

(58) Field of Classification Search
None
See application file for complete search history.

(56) References Cited

U.S. PATENT DOCUMENTS

| | | | | |
|---|---|---|---|---|
| 5,127,858 A * | 7/1992 | Pelligrino | ............ | B63H 21/213 440/2 |
| 5,285,137 A * | 2/1994 | Midas | ....................... | H02P 7/04 318/280 |
| 5,592,058 A * | 1/1997 | Archer | ................. | F24F 11/0009 318/400.08 |
| 6,949,900 B1 * | 9/2005 | Berringer | ................... | H02P 6/08 318/400.03 |
| 2011/0025245 A1 * | 2/2011 | Jeung | ...................... | H02P 6/085 318/400.26 |

* cited by examiner

*Primary Examiner* — Sean Shechtman
(74) *Attorney, Agent, or Firm* — Merchant & Gould P.C.

(57) ABSTRACT

An HVAC control system, associated brushless direct current motor, and methods of operation are disclosed. One such control system includes a brushless direct current motor and an optically-isolated interface exposing control access to the brushless direct current motor. The system includes a first programmable controller electrically connected to the brushless direct current motor, the programmable controller configured to receive a control signal via the optically-isolated interface, and a second programmable controller providing the control signal to the optically-isolated interface.

16 Claims, 6 Drawing Sheets

REMOTELY-PROGRAMMABLE CONTROL CIRCUIT FOR SINGLE-PHASE MOTOR

BACKGROUND

Brushless direct current motors, also referred to as electronically-commutated motors, are often used in HVAC systems due to the high efficiency, long life, and ease of controlling speed, torque, and airflow. Such motors are generally synchronous motors powered by a direct current electric source and associated switching power supply to produce a switching (bi-directional) current.

The maximum power that can be applied to a brushless motor is generally limited by heat generated in the motor. Too much heat can cause damage to winding insulation within the motor. Brushless motors are traditionally higher cost than brushed direct current motors. For example, brushless motors generally require use of an electronic speed controller to operate. Furthermore, even brushed direct current motors may require a similar controller if variable speed control is desirable. Furthermore, the electronic speed controller is generally designed to receive a particular type of input signal, such as a constant direct current voltage signal of a particular value, or an alternating current signal. Such controllers generally lack flexibility to operate with other types of inputs, for example because a specific type of motor expects a certain type of signal. As such, design of systems interfacing to those HVAC controllers is constricted.

Manufacturers of HVAC systems desire to operate motors at a cost minimum, but at the same time, wish to take advantage of the above-cited advantages of brushless direct current motors. Manufacturer of such systems also want to limit the number of different types of motors used, by programming those motors for use in multiple design configurations.

For these and other reasons, improvements in control circuits associated with brushless direct current motors, in particular those used in connection with HVAC systems, are desirable.

SUMMARY

In accordance with the following disclosure, the above and other issues are addressed by the following:

In a first aspect, an HVAC control system is disclosed. The control system includes a brushless direct current motor and an optically-isolated interface exposing control access to the brushless direct current motor. The system includes an optically-isolated interface exposing control access to the brushless direct current motor, and a first programmable controller electrically connected to the brushless direct current motor, the programmable controller configured to receive a control signal via the optically-isolated interface. The system also includes a second programmable controller providing the control signal to the optically-isolated interface.

In a second aspect, a motor controller includes an optically-isolated interface exposing control access to the brushless direct current motor. The assembly also includes a first programmable controller electrically connected to the brushless direct current motor, the programmable controller configured to receive a control signal via the isolated interface. The assembly further includes a second programmable controller providing the control signal to the solated interface.

In a third aspect, a method of operating a brushless direct current motor is disclosed. The method includes setting, via an optically isolated interface circuit, a first operational limit of the brushless direct current motor in a programmable controller electrically connected to and integrated with the brushless direct current motor. The method also includes controlling operation of the brushless direct current motor via the optically isolated interface circuit, whereby operation of the brushless direct current motor is limited by the operational limit.

DETAILED DESCRIPTION

As briefly described above, embodiments of the present disclosure are directed to an HVAC control system, and in particular a control system for a brushless direct current motor. In the various embodiments discussed herein, the HVAC control system includes an optically-isolated portion and an unisolated portion directly connected to and controlling the motor. This arrangement allows for remote programming of the control system, and protects communicatively connected equipment from signals in the portion of the circuit directly connected to the motor (i.e., the "hot" side of the circuit).

Additionally, in some embodiments, the present disclosure allows for various types of operational control arrangements. In some cases, different voltage inputs, and voltage sources, can direct the control system to operate differently, for example using different operational thresholds or features.

Figure 1:
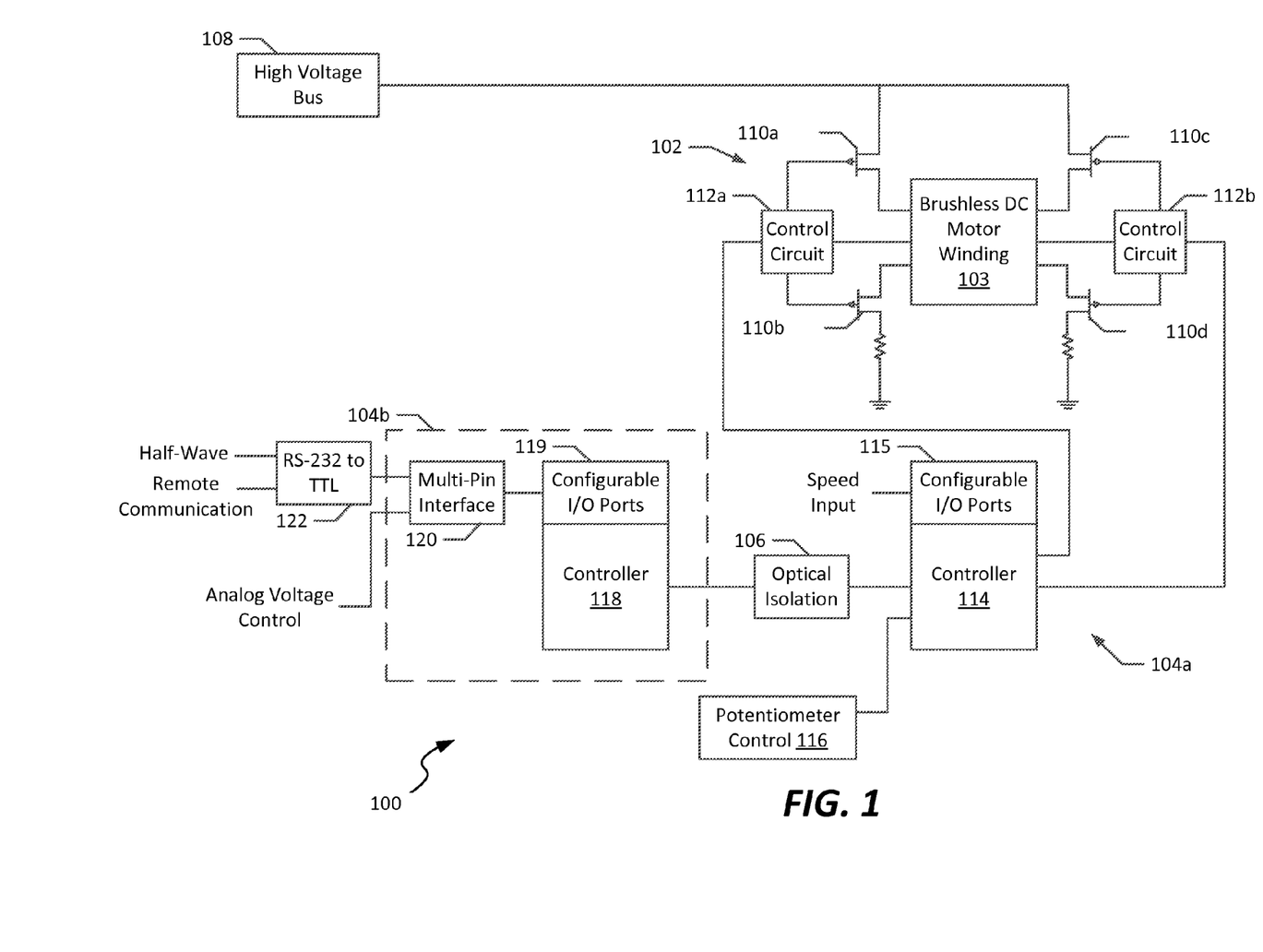
FIG. 1 illustrates a block diagram of an HVAC control system including a control system for a brushless direct current motor, according to an example embodiment.

Referring now to FIG. 1, a simplified block diagram of an HVAC control system 100 is shown. The HVAC control system 100 can correspond to, for example, a control system for a brushless direct current motor, according to an example embodiment.

In the embodiment shown, the HVAC control system 100 includes an interface 102 to a brushless direct current motor. In various embodiments, the interface 102 corresponds to an electrical interface to a winding 103 of a stepper or other type of brushless direct current motor, as is known in the art.

The interface 102 allows the system 100 to apply voltage to a particular connection of the motor, thereby causing the motor to actuate.

Generally, the HVAC control system 100 includes first and second circuits 104a-b, separated by an optical isolation interface 106. The optical isolation interface 106 electrically isolates the first and second circuits 104a-b, thereby preventing unintended, and unpredictable currents in one circuit from affecting electronics in another circuit. In the embodiment shown, the first circuit 104a is sometimes referred to as the "hot side" circuit, since it is interfaced to a main power supply, and includes mixed analog (both direct and alternating current) and digital signals. In contrast, the second circuit 104b can be referred to as the "cold side" circuit, in that it generally corresponds to a low-voltage, class-II circuit, and includes digital, alternating current and direct current analog signals, is entirely isolated from transient currents or other issues that may occur within the circuit 104a.

Figure 3:
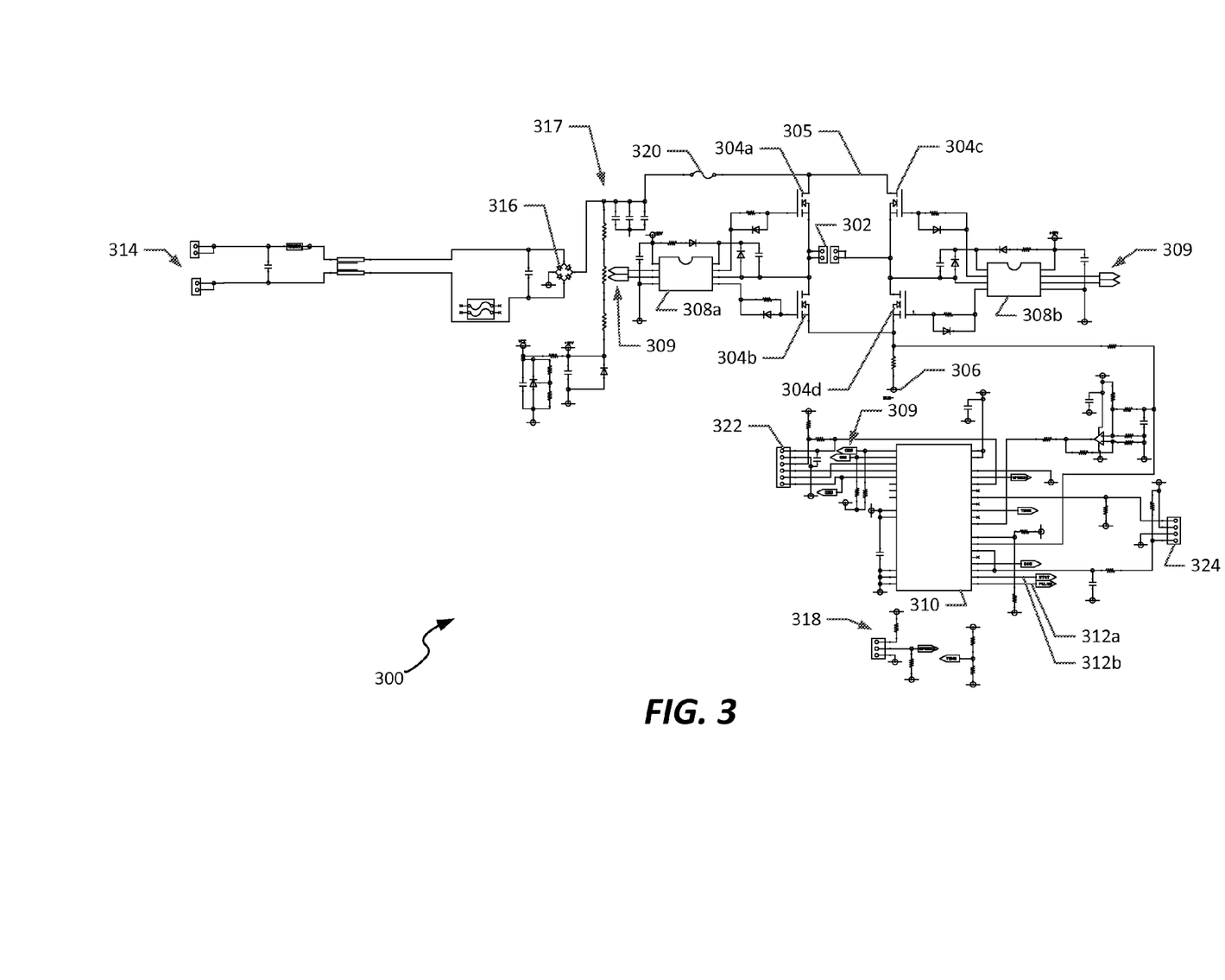
FIG. 3 illustrates an example schematic diagram of a circuit useable in a portion of a control system that remains electrically connnected to the brushless direct current motor and mains power source, useable in connection with the circuit of FIG. 2.

In the embodiment shown, the combination of the first and second circuits 104a-b allow for multiple input signals to control operation of the motor by controlling a signal, or signal limit, applied to the winding 103. For example, in the first circuit 104a, an analog voltage interface 116 can be electrically connected to the winding 103 by way of one or more electrical switches 110a-d, which are managed by control circuits 112a-b. The voltage supply 108 can be configured to receive, for example, a 120 VAC or 240 VAC input, as may be made available from a wall outlet or other analogous power source. The voltage supply 108 is converted via circuitry to a DC signal, as illustrated in FIG. 3, below.

The control circuits 112a-b are in turn managed by a controller 114, which can selectively initiate switching signals at the control circuits 112a-b, thereby causing the voltage delivered from the voltage supply 108 to selectively be applied to the winding 103. In particular, the control circuits 112a-b are configured to open the switches 110a-d to prevent connection to the voltage supply 108, or can close one or more switches (e.g., switches 110a-d) to allow a voltage to be applied to the winding 103 from that interface based on operation of the controller 114. This may occur, for example, with a predetermined switching frequency to affect motor speed, and can be performed in a number of ways.

In some embodiments, controller 114 receives a plurality of types of inputs that define a switching frequency, thereby controlling speed of the motor. In the embodiment shown, the controller 114 can include an input that allows for direct control over speed of the motor via connection to the winding 103. For example, in the embodiment shown, controller 114 includes a plurality of configurable inputs 115. The configurable inputs 115 can be, for example, an A/D converter input, a digital input, a voltage source input, or a current sink, in various configurations, and are capable of receiving an analog or digital input defining a control signal. As illustrated, one or more such control signals can correspond to a speed input useable to control a speed of the motor, by controlling actuation of the switches 110a-d by the control circuits 112a-b, to connect a signal having a particular signal level and/or frequency to the winding 103.

In the embodiment shown, a potentiometer control 116 can also be input to controller 114, allowing a user to manually adjust an input voltage to the controller 114, thereby controlling a switching frequency of signals output to the control circuits 112a-b. In the embodiment shown, the potentiometer control 116 can be used to set a second limit, lower than a maximum limit, for operation of the motor. In alternative embodiments, the potentiometer can be excluded entirely, allowing for inputs to the controller 114 to either be from an input voltage, or based on data signals from the second circuit 104b, or otherwise to operate at a default operational level.

In some embodiments, the potentiometer control 116 can be integrated with a housing of the motor assembly. In such embodiments, a user accessing a HVAC motor assembly can directly adjust operation of the motor by adjusting the potentiometer control 116; in alternative embodiments, the potentiometer can be electrically connected at an alternative location, for example in a circuit positioned remotely from the motor assembly.

In the second circuit 104b, a second controller 118 is configured to receive signals from a plurality of sources, and can be used in conjunction with the controller 114 to control operation of the motor by controlling output to the winding 103. In particular, the second controller 118 receives signals of a variety of types, and converts those signals for use as an output command to the controller 114 (via optical isolation interface 106) to direct operation of the motor. In an example embodiment, the second controller 118 includes an interface 119, for example including a plurality of electrical connections. The electrical connections can correspond to configurable inputs and can be connected to, for example, a plurality of A/D converters, a digital input, a voltage source input, or a current sink integrated with the second controller 118 and configured to receive various voltage signals, each of which may signify a different mode of operation in which to operate the HVAC control system 100.

In the embodiment shown, a multi-pin interface 120 is electrically connected to one or more of the configurable inputs of interface 119. Based on the specific signals (or lack thereof) received at the multi-pin interface 120, the controller 118 can operate in any of a number of operational modes. For example, application of a voltage to two or more pins of the multi-pin interface (as discussed in further detail below) may indicate to the controller 118 to operate in a communication mode, in which it is remotely controlled via a communication circuit 122, discussed in further detail below. Alternatively, a potentiometer could be connected across two or more pins of the multi-pin interface 120, allowing for manual control of operating modes in the controller 118 (and communication of that mode to controller 114). Furthermore, receipt of an analog signal may indicate selection of a pre-programmed operating level as defined in the controller 118, receipt of a direct current analog signal having a known voltage that defines a speed of operation of the motor, or receipt of a pulse width modulated voltage signal. In some embodiments, each of these signals can be configured to be connected to a different pin of a multi-pin interface 120; in other embodiments, the controller 118 is configured to detect one of a plurality of signal forms received, and communicate to controller 114 via the optical isolation interface 106 a particular mode in which to operate the control circuits 112.

In some embodiments, an electrical signal applied to any of a plurality of pins of the multi-pin interface 120 can be used to power circuit 104b. Based on the presence of such a voltage supply, circuit 104b may be capable or incapable (in case of no power) to communicate commands to circuit 104a. In such cases, circuit 104a may either operate according to a command received from circuit 104b (in case power is present), or may operate according to a preset or manually set voltage level (e.g., as set by potentiometer control 116).

Additional details regarding this arrangement are discussed below in connection with example embodiments of FIGS. 2 and 4.

In addition to the various inputs capable of being received at the multi-pin interface 120, in some embodiments, a communication circuit 122 can be interfaced to the controller 118, for example via the multi-pin interface 120 and interface 119. The communication circuit 122 can be, for example, an RS-232 interface configured to receive serial data, and translate that data from a differential signal to a TTL signal to be fed to the interface 119 (via the multi-pin interface 120). The data transmitted to the interface 119 can be relayed from control circuit 118 to control circuit 114, for directing operation of the motor at winding 103. The data can, in various embodiments, include data packets, commands, or other digital or analog command signals capable of being recognized and processed at the controllers 118 and 114.

It is noted that, in some embodiments, controllers 118 and 114 are generally configured to handle events that are expected to occur at differing time rates. For example controller 114 may be configured to handle events occurring within a relatively short period of time (e.g., control circuit switching, speed input information, etc.), while controller 118 can be configured to handle longer-timeframe events. Separating these real time based tasks is particularly useful in allowing controller 118 to transmit a sequence of commands to controller 114 that may be preprogrammed including a ramped and/or delayed response to a change at the multipin connector input. Example time delay effects may include, when indicating a change from a first motor speed or direction to a second motor speed or direction, a series of time delayed commands from the controller 118 that would direct the controller 114 to incrementally speed up, slow down, halt, change direction, or otherwise alter operation of the motor. Inclusion of time delayed-commands only at the "hot" side controller 114 may result in allowing delays or gradual changes in operation of a relatively short timeframe, while use of the "cold" side controller 114 allows for more gradual command changes over time. Furthermore, use of the "cold" side controller 114 in the design illustrated in FIG. 1 allows for gradual (or immediate) changes in operation that are based on changes to input control signals as may be received at the multi-pin interface 119.

The communication circuit 122 can also be configured to provide, for example, an analog signal for delivery to a configurable input of interface 119, such as a half-wave AC signal useable to select a particular pre-programmed operating level for the motor. One example of such a communication circuit 122 is depicted in FIG. 4, described in further detail below. In still further arrangements, and as discussed below, a voltage provided to the circuit 104b from the communication circuit 122 allows for operation of the circuit 104b. Conversely, the absence of a voltage provided from the communication circuit 122 to the circuit 104b will result in the circuit 104a operating in a mode in which it is independent from circuit 104b. This can mean, for example, that the circuit 104a operates at a preprogrammed level, or a level set associated with potentiometer control 116, or deactivates in response to loss of connection between circuits 104a-b.

Referring to FIG. 1 overall, it can be seen that, through use of controllers 114, 118, the HVAC control system 100 can selectively operate using any of a variety of different signal inputs. In example embodiments, any one of a direct current signal, half-wave signal, or command from a remote interface (e.g., the RS-232 interface of a communication circuit, such as circuit 122) can provide different control methods for actuating the winding 103. Furthermore, and discussed further in connection with the specific embodiments of circuits illustrated in FIGS. 2-4, the different control mechanisms of the HVAC control system 100 can be directed to actuate operation of the motor at different speeds or be limited to operation at different speeds. One example illustrating such operation is discussed in further detail below in connection with FIG. 5.

Figure 2:
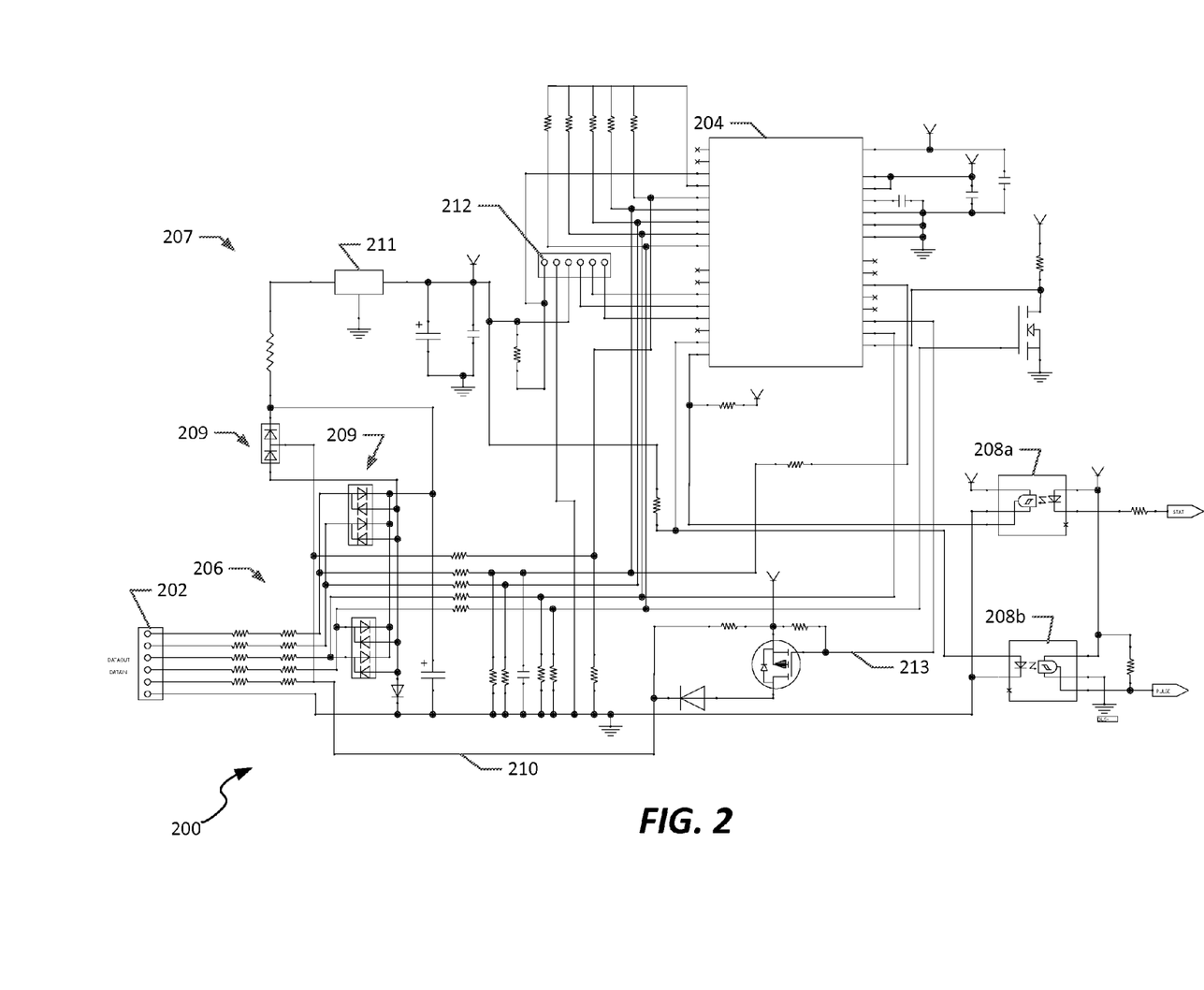
FIG. 2 illustrates an example schematic of a circuit useable for a portion of a control system that is optically isolated from the brushless direct current motor and mains power source, according to an example embodiment.

Referring now to FIG. 2 illustrates an example schematic of a circuit 200 useable for a portion of a control system that is optically isolated from the brushless direct current motor, according to an example embodiment of the present disclosure. The circuit 200 can correspond, in some embodiments, to the "cold" circuit, or circuit 104b, of FIG. 1, above.

In the embodiment shown, the circuit 200 includes a socket 202, including a plurality of electrical connections thereto. In the embodiment shown, the socket includes a serial data input and output connections, labeled "DATAOUT" and "DATAIN". Other connections can be configured to receive, for example serial data, DC voltage, AC voltage, or other signal types. In some example embodiments, the serial data input and output connections can correspond to TTL data connections which can be converted for remote transmission, as discussed in connection with FIG. 4, below.

The socket 202 is electrically connected to a controller 204 via a resistive network 206. The controller 204 can, in various embodiments, correspond to controller 118 of FIG. 1, and includes integrated therein a plurality of configurable inputs, as well as execution units, memory (e.g., Flash or RAM), and communication ports. The resistive network 206 is configured to control current and voltage levels on the connections to the controller 204.

The controller 204 is electrically connected, via serial data pins, to a plurality of optical interfaces 208a-b. The optical interfaces 208a-b represent data transmission channels to/from the controller 204. In particular, optical interface 208a represents an input optical interface, and interface 208b represents an output optical interface. These optical interfaces act to electrically isolate circuit 200 from components on an opposing side of the interface, as discussed above with respect to claim 1. One example circuit useable on a side opposing optical interfaces 208a-b is illustrated in FIG. 3.

Referring to controller 204, it is noted that the configurable inputs of controller 204 are, in the embodiment shown, configured to detect signals at varying signal levels. In various embodiments, the controller 204 has a plurality of switchable operational modes that can be pre-programmed or selected, at least in part, based on a detected input signal at the socket 202. In particular, based on those signals received at the controller 204, the controller 204 may transmit data to another circuit (e.g., circuit 300 of FIG. 3) to control a brushless direct current motor, via the optical interfaces 208a-b. An example set of signals that can be received at controller 204 includes a serial data signal, a half-wave alternating current signal (either positive or negative), or a direct current signal having one of a plurality of signal levels defining different modes of operation. For example, such signals can be received from a serial data and power signaling circuit such as the circuit 400 illustrated in FIG. 4, described below.

The socket 202 is also electrically connected to the controller via a power circuit 207, which includes a diode network 209 and voltage regulator 211. The power circuit is configured such that a received analog signal (e.g., a 12

VDC or 24 VAC signal) can be received at any of a number of the pins (e.g., other than a ground pin), and that signal can be used to power the controller 204, and circuit 200 generally. This allows the socket 202 to be electrically connected to a furnace controller, since the various operational modes of a furnace controller typically mean that at least one of a number of signal pins will be active at a particular time; by allowing for electrical power to be received at any of a number of pins of the socket 202, the circuit 200 can be powered regardless of the current state or mode of the furnace controller.

In a further example embodiment, electrical connections at socket 202, in particular the serial data input and output connections, can be used as a programming interface for the controller 204, or for receiving commands for distribution to other portions of an HVAC control system via the optical isolation interfaces 208a-b, such as the circuit 300 of FIG. 3. In one example embodiment, the electrical connections at the socket 202 can be used to program (or reprogram) controller 204 as well as controller 310 of FIG. 3, below.

In a still further embodiment, at least one of the pins of the socket 202 can be electrically connected to a voltage supply line 210. The voltage supply line 210 can be selectively activated by the controller 204, via control line 213, to provide a logic voltage output (e.g., a 5V or 10V signal) at one of the pins. This allows a user of the circuit 200 to connect a passive (unpowered) circuit element across that pin and another pin of the socket 202 to provide a feedback mechanism by which the circuit 200 can also be controlled. In some such applications, a potentiometer could be electrically connected between two or three such pins of the socket 202 to allow for manual adjustment of an input signal to the controller 204, which in turn can provide an appropriate command to a remote controller (e.g. controller 310 of FIG. 3) defining an operational mode of a motor.

In the embodiment shown, the circuit 200 also includes a programming socket 212, useable to bitwise reprogram the controller 204, for example by re-flashing an EEPROM included within that controller to redefine its operation.

Referring now to FIG. 3, an example schematic of a circuit 300 that is useable in connection with circuit 200 of FIG. 2 to control a brushless direct current motor is illustrated, according to a possible embodiment. The circuit 300 can, in some embodiments, correspond to a particular embodiment of the circuit 104a of FIG. 1, and as such represents a "hot side" circuit of an optically isolated HVAC control system, as explained above.

In the embodiment shown, the circuit 300 includes interface 302 to a brushless direct current motor. The interface 302 can correspond, in the example shown, to a connection to a single winding of such a motor; however, in alternative embodiments, connections to multiple windings of a motor could be used as well.

The circuit 300 further includes a plurality of switches, shown as electrical switches 304a-d (e.g., MOSFET switches) electrically connected to the interface 302, which selectively connect the interface to either a high voltage level, shown as signal line 305, or a local ground 306. Control circuits 308a-b each are also connected to the interface 302, as well as to separate ones of the switches 304a-d, such that each control circuit can be actuated to either directly apply a signal to the interface 302, or to connect the interface either to signal line 305 or local ground 306, based on the combination of switches selected for actuation.

The control circuits 308a-b each have inputs 309 which receive signals from a controller 310. The controller 310 generally provides a programmable drive and control mechanism for actuating a brushless direct current motor by way of interface 302. The controller 310 also includes leads 312a-b, useable for connection to an optical isolation interface, such as optical interfaces 208a-b of FIG. 2, above.

Using leads 312a-b, the controller 310 can bidirectionally communicate with controller 204 of FIG. 2. For example, the controller 310 can be programmed remotely by controller 204, and in turn from a communication connection via socket 202 and a communication circuit illustrated in FIG. 4, described below. For example, the controller 310 can be programmed, based on data received via the optical interfaces 208a-b, to define one or more operational characteristics of an HVAC system and/or an associated brushless direct current motor. In particular, the controller 310 can be programmed to, among other features, track one or more operating parameters of the motor, or of the HVAC system or HVAC controller generally.

For example constant airflow parameters, or a maximum operating condition (e.g., maximum voltage applied to a motor winding, or maximum actuation frequency) could be set in the controller 310. Furthermore, a parameter indicating to the controller 310 whether the motor should be run when an isolated command is not present as recently received from a remote system could be maintained as well. Additionally, parameters that are used by the system in the event the optically isolated circuit 200 is non-functional (e.g., due to lack of power delivered to that portion of the circuit) can also be stored in the controller 310 for use in operating the motor via interface 302. Other operational parameters could be used by the controller, and communicated bidirectionally with controller 204, as well.

In some embodiments, because the commands from the controller 204 of FIG. 2 are received periodically based on the operational mode of that controller, it is recognized that the transmission of comments from controller 204 to controller 310 can be based, for example, on the operational mode of the controller 204, which is dictated at least in part by the signals received at that controller at the socket 202. For example, when the controller 204 is in a programming or communication mode, as recited above, the controller 204 can optionally also provide a command to controller 310 to enter a programming mode, and can transmit such programming data to the controller 310 based on that command. Alternatively, based on other types of modes received at controller 204, other types of communication messages can be received at the controller 310, such as an indication of an operation level based on a DC, AC, or half-wave signal as noted above. Generally, the mode of the controller 204 can inform operation of controller 310, in that controller 310 may receive a message, a signal level (e.g. of a pulse width modulated signal), or some other input type.

Furthermore, as noted above, based on use of controllers 204, 310, different time-delayed commands and/or gradual control changes in operation of the motor can be directed from the controller 204, either based on a pre-programmed algorithm, based on an observed property of the motor (via messages from controller 310), or in response to changes of an input signal or signals at the socket 202. Example gradual operations are discussed above in connection with FIG. 1.

Still referring to FIG. 3, a supply voltage interface 314 can include a two-pin connection, and can be used as a means for delivery of power to the interface 302 of the motor. For example, supply voltage interface 314 can correspond to a wall outlet connection (e.g., either 120 VAC or 240 VAC). In the embodiment shown, the supply voltage interface 314 includes a two-pin connection configured to receive an AC signal, which is then passed to a diode bridge 316 and capacitive network 317 to form an approximately constant DC signal at signal line 305.

As illustrated, the controller 310 is further configured to receive a potentiometer at potentiometer connection 318, including a separate potentiometer connection electrically received at an interface of the controller. The potentiometers connection 318 allows a user to set a variable resistance, to provide a reduction in the power signal at the controller, and limiting a maximum operation of the controller 310. In particular, by adjusting a potentiometer connected to the potentiometer connection 318, a user can manually set an operating point for the brushless direct current motor when it is operated. A fuse connection 320 protects the signal line 305 (and accordingly the interface 302 to the motor) from other signal abnormalities.

In addition to the above, one or more additional control inputs can be provided to the controller 310, for use in directing operation of a brushless DC motor at interface 302. For example, first and second connectors 322, 324, respectively, can be used to directly control or monitor operation of controller 310 in connection to the interface 302 (i.e., for control of the motor). In some embodiments, a DC signal (e.g., 5 VDC or 10 VDC) or analog signal can be delivered to one of the connectors 322, 324 for directing control of the interface 302 (e.g., using a pulse-width modulated signal). In alternative embodiments, one or both of connectors 322, 324 can receive a signal from connector 208b of FIG. 2.

Figure 4:
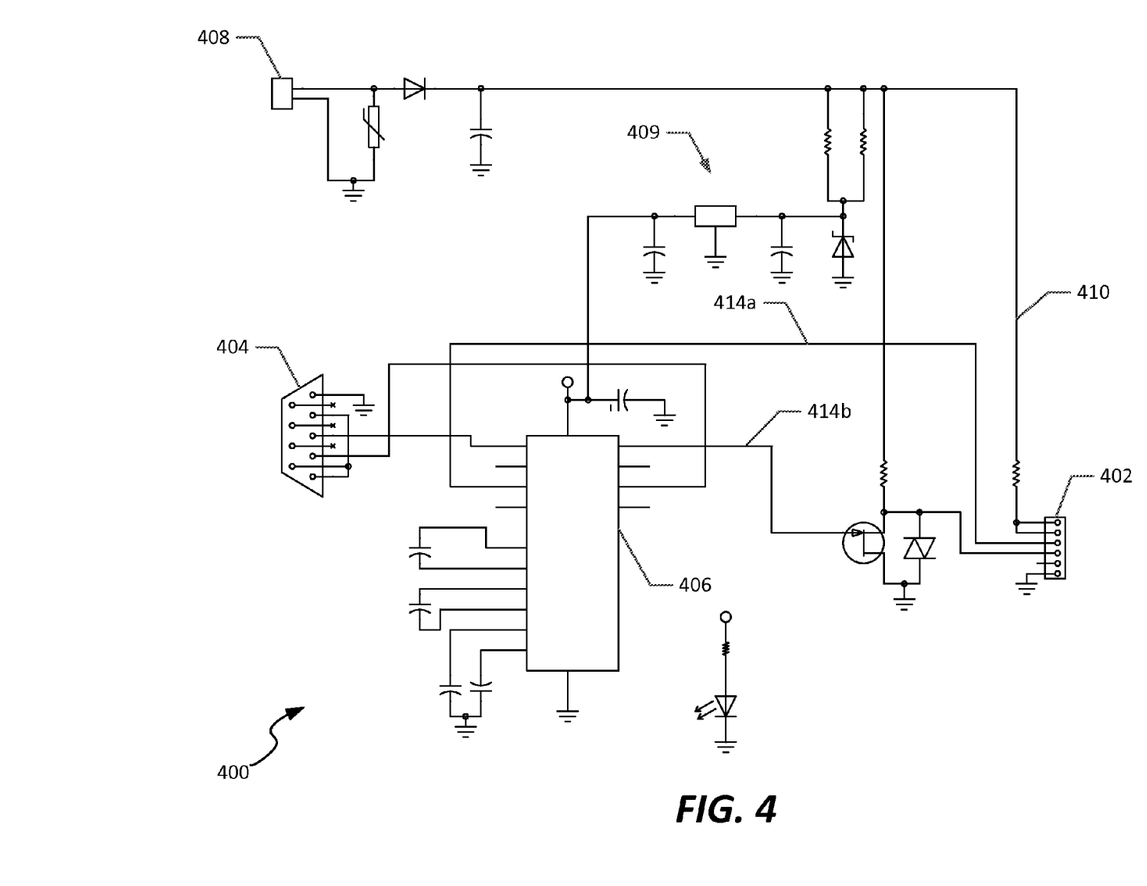
FIG. 4 illustrates an example schematic diagram of a communication circuit usable to translate RS-232 communications to high voltage TTL signals for use in the HVAC control system of FIG. 1.

Referring to FIG. 4, an example schematic diagram of a communication circuit 400 that is usable to receive signals defining operational control of the motor is illustrated. The communication circuit 400 includes a plurality of inputs each leading to a connector 402, that can connect, for example, to the socket 202 of FIG. 2. In some embodiments, the communication circuit 400 can correspond to a particular embodiment of the communication circuit 122 of FIG. 1, and is selectively connected to the circuit 200, for example to be used in cases where remote control, communication, or programming with circuits 200, 300 is desired.

In the embodiment shown the communication circuit 400 includes a serial data interface 404 that can be configured to receive a multi-pin serial interface. In the example embodiment shown the serial data interface 404 corresponds to an RS-232 interface. The serial data interface 404 is electrically connected to a conversion circuit 406, which converts the differential signal received on the RS-232 interface to TTL signals to be delivered to circuit 200 (and in particular to controller 204) by connector 402.

In such embodiments, the serial data interface 404 can be used for remotely communicating with the controllers 204, 310 of FIGS. 2-3, and in particular for both (1) monitoring operational parameters of the controllers, and associated brushless DC motor, and for (2) delivering operating commands or reprogramming one or both controllers 204, 310. The serial data interface 404 can be used to program the controller 310 identifying various operating conditions based on the signals available at the interface and tracked by controller 204, such as RPM, torque or airflow. Other operating conditions, or operational parameters, can be tracked as well.

In the embodiment shown, the communication circuit 400 also includes a further analog input connector 408, electrically connected to one or more pins of the connector 402. The analog input connector 408 is configured to receive either an AC or DC signal that can be used to both power the conversion circuit 406 (after conversion to DC via regulation circuit 409) and to deliver a signal indicative of a programming mode. In particular, line 410 corresponds to delivery of a programming mode to the controller 204, defined by a voltage level (after transmission to the controller 204 via resistive network 206). Line 412 can also provide a power signal, for example via a traditionally-available 24 VAC signal, to the circuit 300 generally, and lines 414a-b represent the TTL signals sent and received from controller 204, respectively. In particular, in some embodiments the controller 204 enters a programming or remote communication mode when a high voltage (e.g., 12 VAC or 24 VAC) signal is detected at pins of socket 202 that are connected to lines 410 of circuit 400.

Referring to FIGS. 2-4 generally, it is recognized that circuits 200, 300, 400 can interact to provide an HVAC control system, or alternatively, a control system for a brushless DC motor, that supports control by a plurality of interfaces, including a manual adjustment interface (e.g., potentiometer connection 318), a DC interface at a variety of levels (e.g., via analog input connector 408), a pulse-width modulated input interface (e.g., based on electrical signals received from connector 208b), or a data communication interface (e.g., via serial data interface 404). Accordingly, the circuits 200-400 can also provide a hierarchy of communication and control methodologies when two or more of such signals are present.

For example, as a default, it may be preferable to provide control by way of a data communication interface and controllers 204, 310; however, in cases where power is not delivered to the "cold side", optically isolated circuit 300, by default control of the brushless DC motor can revert to the operational level set by a potentiometer at the potentiometer connection 318 or a level set by pre-programming a performance level at the controller 310. In the alternative, the controller 310 can maintain a preprogrammed performance level. Among the various types of connections received by configurable inputs of controller 310, the controller 310 can include a policy defining an order of preference among the signal types (e.g., message-based, half-wave, or DC signal receipt each capable of independently setting an operational level for controller 310 to provide to interface 302, and as communicated to controller 310 by controller 204.)

In addition, the overall system allows for remote connection to and communication with a "cold side" circuit, such as circuit 200 of FIG. 2, without worry regarding damage based on signals/noise occurring on the "hot side" circuit 400 shown in FIG. 4.

Figure 5:
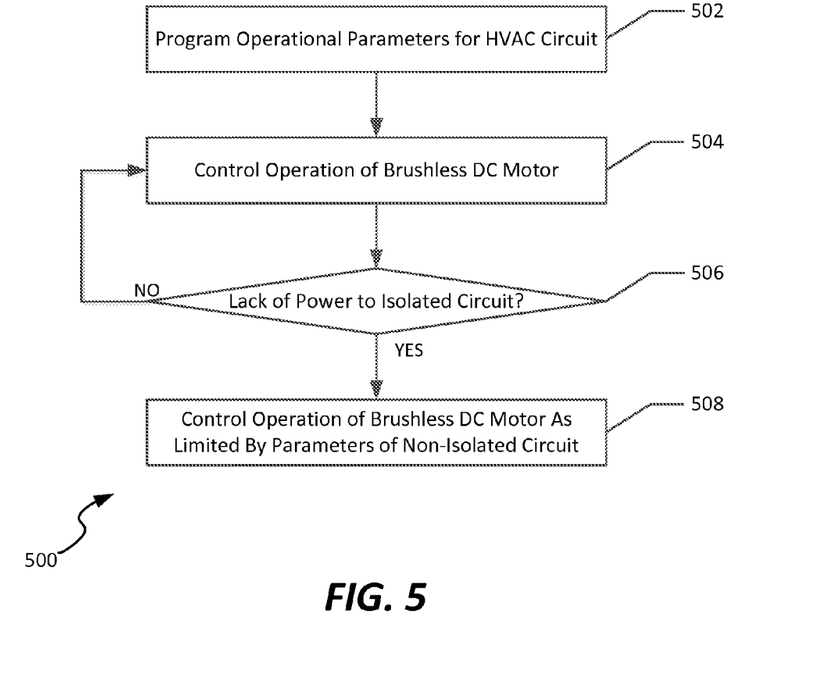
FIG. 5 illustrates a flowchart of a method of operation of an HVAC control system including a control system for a brushless direct current motor, according to an example embodiment.

Referring now to FIG. 5, a further example flowchart of a method 500 of operation of an HVAC control system is shown. The HVAC control system can correspond to either system 100 of FIG. 1, or the system illustrated in FIGS. 2-4, and generally corresponds to a method that can be performed as associated with a brushless direct current motor. The method 500 of FIG. 5 can correspond, for example, to selectable control of a motor based on either commands from a "cold" side circuit 104b, 200, or based on pre-programmed operation of a "hot" side circuit 104a, 300.

In the embodiment shown, the method 500 includes programming an HVAC control circuit to operate using a plurality of operational parameters for operation of a brushless DC motor. This can include, for example, transmitting a command to the HVAC control circuit, such as via a remote system (at a customer interface, such as RS-232 serial interface) (step 502). This can be based on receipt of a digital communication on the serial interface, or based on a varying DC voltage defining a particular operational level. This operational limit can be applicable, for example, in the case where a "cold side" (e.g., circuits 104b, 200) of the overall control circuit is powered and active, and results in providing programming parameters to controller 310 of FIG. 3, including, for example, a maximum operational setting, a setting defining an operation to occur when connection to a "cold" side is not present, and other operational parameters for use with motor control.

The method 500 additionally includes controlling the speed of operation of a motor by controlling an interface thereto (e.g., interface 302, or at winding 103), by controllers (e.g., controllers 114, 118, or controllers 204, 310), for example based on the initial or subsequent programming of the circuit in step 502 (step 504). In particular, controllers of a particular HVAC control circuit will open switches (e.g., switches 110*a-d*, or 304*a-d*) to ensure direct control of the interface or winding by the controllers, rather than a separate AC or analog connection, based on action of controllers 204, 310. In particular, controllers 114, 310 can receive any of a variety of types of inputs from the "cold side" circuit 104*b*, 200, including a voltage level, program data, or other types of analog or digital signals useable to set an operating level of the controller 310 and therefore control a speed of a motor via the interface 302.

The method 500 also includes a determination that, at some time after initial operation, a portion of the overall HVAC control circuit is not receiving a power signal, such as the "cold side" circuit 200 of FIG. 2, or the circuit portion 104*b* of FIG. 1 (step 506). The power signal can be, for example, be a signal received at connector 408 of FIG. 4, for delivery to circuit (e.g., circuits 104*a*, 200) that is isolated from the "hot side" circuit (e.g., circuits 104*a*, 300). If power is delivered to the "cold side" circuit, use of the programmable controllers will continue in step 504. However, in the absence of power, controllers 118, 204 of FIGS. 1-2 are unable to provide program control over controllers 114, 310 of FIGS. 1, 3 respectively. Accordingly, the controllers 114, 310 can be adjusted to change use of switches (switches 110*a-d* or 304*a-d*) to be limited by an operational limit set in step 502 (step 508). That second operational limit can be, for example, a pre-programmed maximum limit that is to be used in the absence of an updated signal received at the controller 114, 310.

Figure 6:
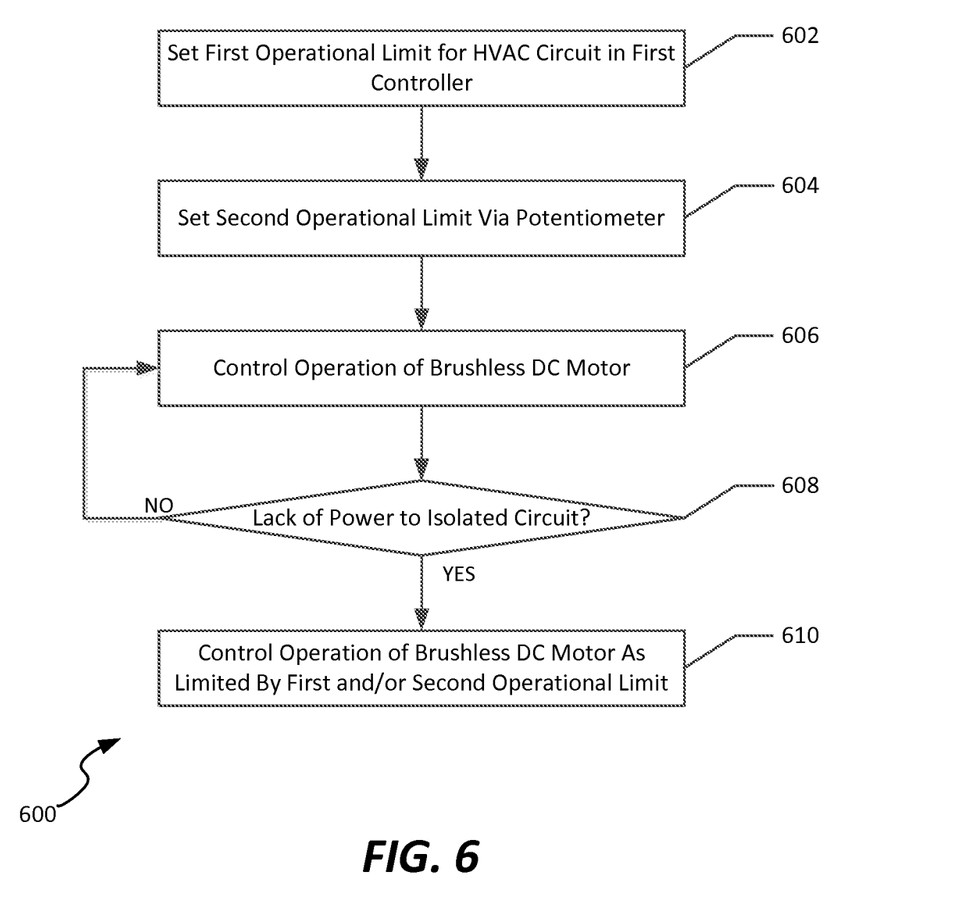
FIG. 6 illustrates a flowchart of a method of operation of an HVAC control system including a control system for a brushless direct current motor, according to a further example embodiment.

Referring now to FIG. 6, a flowchart of a method 600 of operation of an HVAC control system is disclosed. The HVAC control system can correspond to either system 100 of FIG. 1, or the system illustrated in FIGS. 2-4, and generally corresponds to a method that can be performed as associated with a brushless direct current motor, and in particular is a method performed at the "hot" side of the system (e.g., circuits 104*a*, 300) based on various thresholds pre-programmed at that side of the overall system.

In the embodiment shown, the method 600 includes programming an HVAC control circuit, such as at controller 114, 310, to operate using a first operational limit for operation of a brushless DC motor. This can include, for example, transmitting a command to the HVAC control circuit, such as via a remote system (at a customer interface, such as RS-232 serial interface) (step 602). This can be based on receipt of a digital communication on the serial interface, or based on a varying DC voltage defining a particular operational level. This operational limit can be applicable, for example, in the case where a "cold side" (e.g., circuits 104*b*, 200) of the overall control circuit is powered and active.

The method 600 further includes setting a secondary operational limit that can be used in the absence of power delivered to the "cold side" of the overall control circuit (step 604). This can include, for example, manually setting one or more variable resistors, such as potentiometers, that are electrically connected to the first control (300) and the motor (103). This second limit can be, for example, a limit below the operational limit set in step 602, above.

The method 600 additionally includes controlling the speed of operation of a motor by controlling an interface thereto (e.g., interface 302, or at winding 103), by controllers (e.g., controllers 114, 118, or controllers 204, 310), based on commands that do not exceed the operational limits set in the initial programming of the circuit in step 602 or in setting a potentiometer (step 606). In particular, controllers of a particular HVAC control circuit will generate control signals for switches (e.g., switches 110*a-d*, or 304*a-d*) to ensure direct control of the interface or winding by the controllers, rather than a separate AC or analog connection. Furthermore, the switching operation directed by the controllers 114, 310 occurs at a frequency or current level as defined by receipt of commands from a "cold side" controller, 118, 204, as discussed above.

The method 600 also includes a determination that a portion of the overall HVAC control circuit is not receiving a power signal, such as the "cold side" circuit 200 of FIG. 2, or the circuit portion 104*b* of FIG. 1 (step 608). The power signal can be, for example, be a signal received at connector 408 of FIG. 4, for delivery to circuit (e.g., circuits 104*a*, 200) that is isolated from the "hot side" circuit (e.g., circuits 114*a*, 300). If power is delivered to the "cold side" circuit, use of the programmable controllers will continue in step 606. However, if no power is provided, the controllers can be adjusted to change use of switches (switches 110*a-d* or 304*a-d*) to use a signal received via the analog input connector 408, and limited by a second operational limit set manually using variable resistors (e.g., potentiometers) or via a pre-programmed level in controller 114, 310 (step 610). It is noted that, based on the presence of a potentiometer in such a circuit, and the operational level set in the controller 114, 300, the potentiometer could set a secondary limit below the programmed operational limit in that "hot" side controller 114, 300, thereby allowing direct control and/or adjustment of operation of the motor locally in the event of loss of power or lack of communication with the "cold" side circuit 104*b*, 200.

It is noted that, although the method 600 of FIG. 6 illustrates a particular example in which different control and power inputs to a brushless DC motor are selected, other methods can be implemented in controllers of the present disclosure to select from among a hierarchy of different electrical control scenarios, such as from a DC signal, a positive or negative half-wave signal, digital messages, or other methods.

Referring now to FIGS. 1-6 overall, and in particular the methods provided in FIGS. 5-6, embodiments of the disclosure may be practiced in various types of electrical circuits comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, aspects of the methods described herein can be practiced within a general purpose computer or in any other circuits or systems.

Embodiments of the present disclosure can be implemented as a computer process (method), a computing system, or as an article of manufacture, such as a computer program product or computer readable media. The computer program product may be a computer storage media readable by a computer system and encoding a computer program of instructions for executing a computer process. Accordingly, embodiments of the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium can include any medium that includes media capable of containing or storing the program for use by or in connection with the instruction execution system, apparatus, or device.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media. Further, the disclosed methods' stages may be modified in any manner, including by reordering stages and/or inserting or deleting stages, without departing from the overall concept of the present disclosure.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. An HVAC control system comprising:
 a brushless direct current motor;
 an optically-isolated interface exposing control access to the brushless direct current motor;
 a first programmable controller electrically connected to the brushless direct current motor, the programmable controller configured to receive a control signal via the optically-isolated interface;
 a second programmable controller providing the control signal to the optically-isolated interface; and
 a potentiometer electrically connected to the first programmable controller and useable to set a maximum operating condition of the brushless direct current motor;
 wherein the maximum operating condition set using the potentiometer defines the second maximum operating condition of the brushless direct current motor used in the event of a lack of power to the optically isolated interface;
 wherein the first programmable controller is further configured to operate at a level dependent upon a position of the potentiometer if no signal is present at the optically-isolated interface; and
 wherein the potentiometer is integrated with a housing of the brushless direct current motor.

2. The HVAC control system of claim 1, wherein the second programmable controller includes a plurality of input connections, each of the input connections configured to receive any of a plurality of differing types of input control signals.

3. The HVAC control system of claim 2, wherein the second programmable controller has a plurality of modes, wherein a mode of the plurality of modes is selected for use with a predetermined input type at the input connections.

4. The HVAC control system of claim 2, wherein the second programmable controller has a plurality of modes, the plurality of modes selected based upon one or more inputs received at the input connections.

5. The HVAC control system of claim 2, wherein the plurality of modes includes a programming mode.

6. The HVAC control system of claim 5, wherein the plurality of input connections are electrically connected to pins of a multi-pin interface.

7. The HVAC control system of claim 6, wherein the first and second programmable controllers are programmable via the multi-pin interface.

8. The HVAC control system of claim 6, wherein the second programmable controller receives a power signal from any of the pins of the multi-pin interface.

9. The HVAC control system of claim 6, wherein the second programmable controller selectably provides a DC voltage on at least one pin of the multi-pin interface.

10. The HVAC control system of claim 1, wherein the optically-isolated interface includes first and second optical interfaces, wherein the first optical interface is configured to transmit data from the second controller to the first controller and the second optical interface is configured to transmit data from the first controller to the second controller.

11. A method of operating a brushless direct current motor, the method comprising:
 sending a control signal to a first programmable controller from a second programmable controller, via an optically isolated interface circuit, said control signal including a first operational limit of the brushless direct current motor, the first programmable controller electrically connected to and integrated with the brushless direct current motor;
 controlling operation of the brushless direct current motor via the optically isolated interface circuit, whereby operation of the brushless direct current motor is limited by the first operational limit;
 accessing a potentiometer integrated on a housing of the brushless direct current motor;
 adjusting the potentiometer that is electrically connected to the programmable controller to set an operating point of the brushless direct current motor; and
 controlling operation of the brushless direct current motor at a level dependent upon a position of the potentiometer if no signal is present at the optically-isolated interface.

12. The method of claim 11, further comprising:
 receiving a first programming signal at the second programmable controller from a multi-pin interface; and
 in response to the first programming signal, transmitting a second programming signal to the first programmable controller.

13. The method of claim 11, further comprising providing a deactivation signal to the first programmable controller from the second programmable controller.

14. The method of claim 11, wherein, in an absence of a deactivation signal, the first programmable controller operates at a preset level defined at least in part at the first programmable controller.

15. The method of claim 11, further comprising setting a first operational limit of the brushless direct current motor below a second operational limit programmed into the first programmable controller by adjusting the potentiometer electrically connected to the programmable controller.

16. The method of claim 11, wherein controlling operation of the brushless direct current motor comprises remotely controlling operation of the brushless direct current motor.

* * * * *

UNITED STATES PATENT AND TRADEMARK OFFICE
CERTIFICATE OF CORRECTION

PATENT NO. : 9,503,001 B2
APPLICATION NO. : 13/830284
DATED : November 22, 2016
INVENTOR(S) : Wasson et al.

It is certified that error appears in the above-identified patent and that said Letters Patent is hereby corrected as shown below:

In the Specification

Column 2, Line 22: "connnected" should read --connected--

Signed and Sealed this
Twenty-first Day of November, 2017

Joseph Matal
*Performing the Functions and Duties of the*
*Under Secretary of Commerce for Intellectual Property and*
*Director of the United States Patent and Trademark Office*